United States Patent
Chen et al.

(10) Patent No.: US 7,589,324 B2
(45) Date of Patent: Sep. 15, 2009

(54) USE OF SOLDER MASK AS A PROTECTIVE COATING FOR RADIATION DETECTOR

(75) Inventors: Henry Chen, Victoria (CA); Glenn Bindley, West Vancouver (CA); Pinghe Lu, Surrey (CA)

(73) Assignee: Redlen Technologies, Sidney, British Columbia (CA)

( * ) Notice: Subject to any disclaimer, the term of this patent is extended or adjusted under 35 U.S.C. 154(b) by 100 days.

(21) Appl. No.: 11/642,819

(22) Filed: Dec. 21, 2006

(65) Prior Publication Data

US 2008/0149844 A1    Jun. 26, 2008

(51) Int. Cl.
   *G01T 1/24*   (2006.01)
(52) U.S. Cl. ............... 250/370.08; 250/370.09; 250/370.13
(58) Field of Classification Search ........... 250/370.08, 250/370.09, 370.13
   See application file for complete search history.

(56) References Cited

U.S. PATENT DOCUMENTS

| | | | |
|---|---|---|---|
| 5,100,767 A * | 3/1992 | Yanagawa et al. ........ 430/280.1 |
| 5,368,882 A | 11/1994 | Tran et al. |
| 5,677,539 A | 10/1997 | Apotovsky |
| 5,905,264 A | 5/1999 | Shahar et al. |
| 5,933,706 A | 8/1999 | James et al. |
| 6,034,373 A | 3/2000 | Shahar et al. |
| 6,037,595 A | 3/2000 | Lingren |
| 6,043,106 A | 3/2000 | Mescher et al. |
| 6,046,068 A | 4/2000 | Orava et al. |
| 6,069,360 A | 5/2000 | Lund |
| 6,121,622 A * | 9/2000 | Beyne et al. .............. 250/374 |
| 6,175,120 B1 | 1/2001 | Macgregor et al. |
| 6,215,123 B1 | 4/2001 | Orava et al. |
| 6,329,658 B1 | 12/2001 | Mestais et al. |
| 6,333,504 B1 * | 12/2001 | Lingren et al. ......... 250/370.01 |
| 6,410,922 B1 | 6/2002 | Spartiotis et al. |
| 6,510,195 B1 | 1/2003 | Chappo et al. |
| 6,524,966 B1 | 2/2003 | Wright et al. |
| 6,694,172 B1 | 2/2004 | Gagnon et al. |
| 6,765,213 B2 * | 7/2004 | Shahar et al. .......... 250/370.09 |
| 7,038,288 B2 | 7/2004 | Lai et al. |
| 6,781,132 B2 | 8/2004 | Macgregor |
| 7,223,981 B1 * | 5/2007 | Capote et al. .......... 250/370.13 |
| 2001/0035497 A1 | 4/2001 | Montemont et al. |
| 2002/0066531 A1 | 6/2002 | Ke et al. |
| 2002/0182716 A1 | 12/2002 | Weisbuch et al. |
| 2003/0173523 A1 * | 9/2003 | Vuorela ................. 250/370.13 |
| 2007/0158574 A1 * | 7/2007 | Petrillo et al. .......... 250/370.13 |

FOREIGN PATENT DOCUMENTS

EP     1 156 347 A1    11/2001

OTHER PUBLICATIONS

U.S. Appl. No. 11/527,707, filed Sep. 27, 2006, Chen et al.
U.S. Appl. No. 11/633,091, filed Dec. 4, 2006, Chen et al.

* cited by examiner

*Primary Examiner*—David P Porta
*Assistant Examiner*—Casey Bryant
(74) *Attorney, Agent, or Firm*—Foley & Lardner LLP

(57) ABSTRACT

A radiation detector is described having a semiconductor substrate with opposing front and rear surfaces, a cathode electrode located on the front surface of said semiconductor substrate, a plurality of anode electrodes located on the rear surface of said semiconductor substrate and a solder mask disposed above the anode electrodes. The solder mask has openings extending to the anode electrodes for placing solder in said openings.

9 Claims, 5 Drawing Sheets

430

430

440

460

470

450

450

US 7,589,324 B2

USE OF SOLDER MASK AS A PROTECTIVE COATING FOR RADIATION DETECTOR

TECHNICAL FIELD

The present invention relates generally to detectors for gamma-ray and X-ray detectors, and more particularly to pixilated cadmium zinc telluride detectors.

BACKGROUND OF THE INVENTION

A small number of companies worldwide currently produce CdZeTe (CZT) detectors commercially in a variety of sizes and thicknesses. Usually one or both sides of the planar detectors are contacted with a continuous metal layer such as gold (Au) or platinum (Pt). Such detector substrates then need to be processed to produce a detector having a pattern of segmented contacts (e.g. pixel pads) on one surface, with the opposite surface remaining uniformly metallized. This is done so that the detector is able to produce a detector output indicating the position at which radiation impacts the detector.

SUMMARY OF THE INVENTION

An embodiment of the present invention describes a radiation detector comprising a semiconductor substrate having opposing front and rear surfaces, a cathode electrode located on the front surface of said semiconductor substrate, a plurality of anode electrodes located on the rear surface of said semiconductor substrate and a solder mask disposed above the anode electrodes, said solder mask comprising openings extending to the anode electrodes for placing solder balls in said openings.

A corresponding method of forming a soldering mask on a detector device comprises the steps of (a) providing a radiation detector comprising: a semiconductor substrate having front and rear surfaces, a cathode electrode formed on the front surface of said semiconductor substrate, and a plurality of anode electrodes formed on the rear surface of said semiconductor substrate, (b) forming a solder mask layer directly on the anode electrodes, and (c) patterning the solder mask layer to form openings to the anode electrodes.

DETAILED DESCRIPTION OF THE PREFERRED EMBODIMENTS

Radiation detectors as described herein, comprise a semiconductor material, such as a semiconductor material preferably comprising CdZnTe (CZT) or CdTe. More preferred is $Cd_{(1-x)}Zn_xTe$ (where x is less than or equal to 0.5), a wide band gap ternary II-VI compound semiconductor with unique electronic properties. This type of semiconductor is useful in gamma-ray and X-ray detectors which are used as spectrometers that operate at room temperature for nuclear radiation detection, spectroscopy and medical imaging applications.

The common configuration of these devices is a cathode electrode and a plurality of anode electrodes located on opposite sides of a semiconductor plate or substrate. Typically these radiation detectors have pixilated anode electrode arrays fabricated by various deposition and lithography processes resulting in a gap between pixels, termed the interpixel gap or interpixel region.

The following definitions are used herein:

Cathode electrode: the electrode on one major surface of the detector substrate where incident gamma rays or x-rays enter the detector, i.e. positioned towards the radiation source.

Anode electrodes: segmented electrode contacts located on the rear surface of the substrate, i.e. positioned away from the radiation source.

Interpixel or inter pixel: the region or gap separating pixel electrodes. For electrode configurations with non-pixellated discrete contact segments the term is equivalently applied to the gap between contact segments.

Solder ball: any bonding bump or ball, which is used to contact a printed circuit board, and which is made of solder and other similar tin and/or lead alloys.

Figure 1:
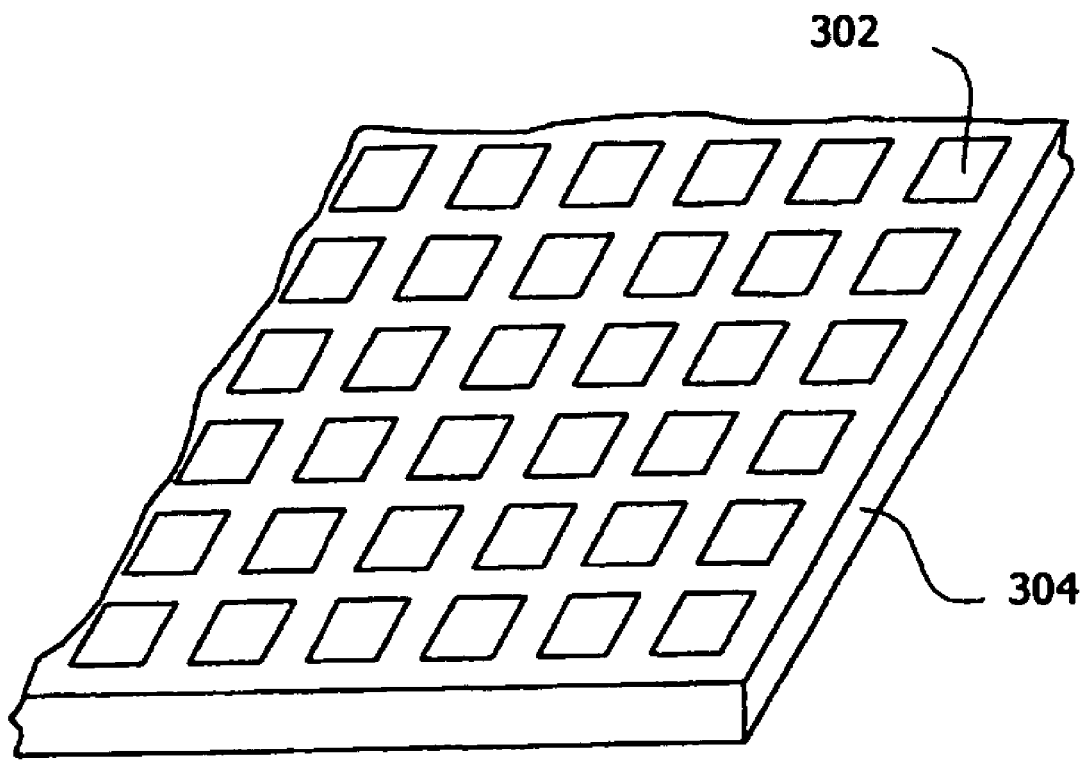
FIG. 1 is a perspective view of a CZT substrate with anode electrode pixels.

Illustrated in FIG. 1, is an example of pixellated anode electrodes 302 formed on a semiconductor substrate 304, such as a CZT substrate (also referred to as a "tile"). The cathode electrode is formed on the bottom side of the substrate 304.

FIGS. 2A-I illustrate an example of steps in method of forming tri-layer metal contacts on a semiconductor substrate at positions (pixels) for defining radiation detector cells with an interpixel gap with high resistivity between the detector cells. In this example, it is assumed that the semiconductor substrate is made of cadmium zinc telluride (CdZnTe) or cadmium telluride (CdTe), although it will be appreciated that other semiconductor materials, for example lead iodide, thallium bromide, gallium arsenide or silicon, can be used. Also, it will be assumed that the metal used for the metallization layer and the contacts is gold, although it will be appreciated that other metals, alloys or other conductive materials, for example platinum or indium, could be used.

Thus, FIGS. 2A-2I are a schematic cross-sectional views from the side of a detector substrate at various stages in the formation of gold contacts on a CdZnTe substrate. The detailed features and structure at each step of the process are shown, resulting in an array of anode contact pixels on the rear surface of the CZT (drawn as facing up in this illustration), optional protective side coatings, and a single cathode electrode on the front surface of the CZT tile (drawn as facing down in this illustration). In this example, two additional contact layers are added on to the pixilated primary contact layer on the rear side, for improved device assembly. The process can be applied to any array size and pixel configuration for CZT devices. A typical device size is a 20×20×5 mm detector, having 8×8 pixels or 11×11 pixels depending on the application. As a precursor to contact fabrication, the CZT wafer is polished and etched such that high quality clean crystal surfaces are prepared for the deposition process.

Figure 2A:
FIGS. 2A-I are schematic cross-sectional views of a method of making a detector substrate at various stages in the formation of contacts thereon.

The direct lithography fabrication process is described with reference to FIGS. 2A-I, and for the case of the primary contact being gold, with two additional contact layers, and for simultaneous forming of the cathode contact on the opposing side of the CZT tile or substrate 304 shown in FIG. 2A.

Figure 2B:
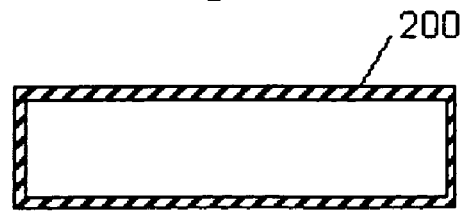

In step 1, shown in FIG. 2B a primary layer of gold 200 is deposited on the CZT tile 304. The gold layer 200 may be deposited by electroless deposition. Alternatively the gold layer 200 may be deposited by other known techniques, such as sputtering. The CZT tiles are first cleaned in acetone, as is well known. The clean CZT tiles 304 are dipped in an electroless gold solution for several minutes depositing a gold layer 200, then the tile is removed and rinsed with methanol. Typical thickness of deposition is equal or more than 100 nm. The deposited gold may be annealed at 90 deg C. for 15 minutes to increase adhesion to the substrate. An adhesion test can be done after a few hours using Scotch tape to confirm quality of the adhesion.

Figure 2C:
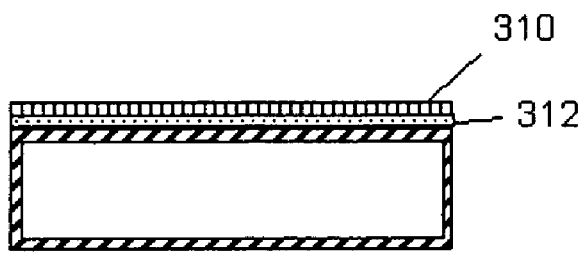

In an optional step 2 shown in FIG. 2C, two additional contact layers are deposited onto the rear side (anode side to be pixilated) of the tile, over the primary contact layer 200 on the rear side. In this example, a Ni layer 312 is deposited using sputtering or a thermal evaporation process to a thickness<100 nm and nominally 50 nm. Then another gold layer 310 is deposited using sputtering, thermal evaporation and/or an electroless process to a thickness<50 nm and nominally 20 nm. Alternative conductive contact material can be substituted for either or both of the additional contact layers.

Figure 2D:
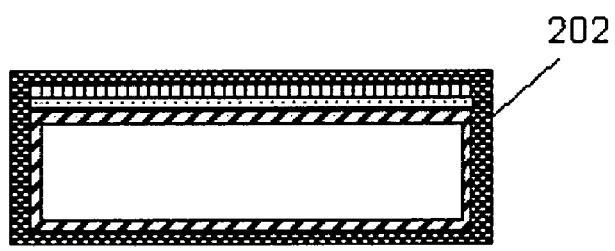

In step 3, as shown in FIG. 2D, a photoresist 202 is applied over the contact layer(s). Tiles 304 are dipped in resist, for example Shipley 1805 resist. Excessive resist is removed if necessary from the edge using a Q-tip, making sure the resist does not form any edge bead (especially on the pixilated face) as this would be detrimental for the pixel quality. Generally, the least possible amount of resist should remain on the pixilated face. The resist should be dried out for 10 minutes with the pixilated face kept up and horizontal.

The resist coating is hardened in step 4 by baking for 10 minutes at 90° C. This step is done to drive excess solvent out of the resist. The tile is now prepared for lithography exposure.

Figure 2E:
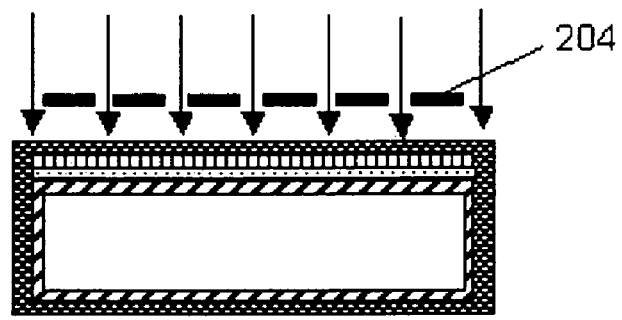

In step 5, as shown in FIG. 2E a pixel pattern is formed on the rear side of the tile 304 by photolithography. A UV mask 204 is aligned over the CZT tile surface, and the positive resist is exposed to UV. The direct lithography mask shades regions of the resist in a selected pixel pattern and exposes interpixel gaps to UV radiation. A contact mask is shown but other methods will work as well, such as proximity and projection masks. A glass plate is placed on top making sure that the glass plate is horizontal. This ensures uniform contact between the tile and the mask. For the exemplary resist, exposure by a UV lamp (365 nm wavelength) for several minutes is suitable. If desired, a negative resist may be used instead of the positive resist (in which case, the exposure mask's transparent and opaque regions are reversed).

Figure 2F:
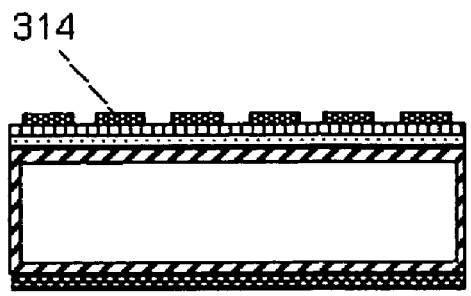

In step 6 shown in FIG. 2F, the exposed photoresist is developed. The resist developer (for example Microposit developer, MF-319) should cover the tile(s). The tiles are placed into the developer with the pixilated side facing up, developed for 2 minutes and the tile(s) are removed from the developer and rinsed in de-ionized water. The UV exposed resist is removed, in preparation for creating the interpixel gap.

In step 7 the remaining resist pixel pattern 314 is baked for 20 minutes at 90° C. This step is done to harden the resist further.

Figure 2G:
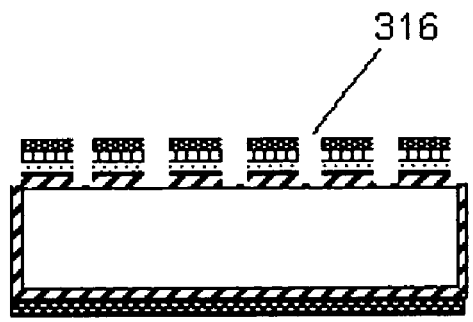

In step 8, shown in FIG. 2G, the exposed contact regions 316 (not covered by the pixel resist pattern 314) are etched. For the example contact materials, the following etching solution is suitable for etching through either just the primary contact layer or the optional three-layer contact. A 2% Br-Ethanol Glycol (BrEG) solution is prepared by pouring a 25 ml of Ethylene Glycol into a plastic beaker, then 0.5 ml of Bromine is added using a disposable pipette. Using the same pipette, the solution is mixed thoroughly until it becomes uniform. However, a different pipette or mixing device may also be used. Etching is conducted for approximately 3 minutes. This etching is done to remove unmasked interpixel contact material. To open the interpixel gap to achieve clean interpixel gaps, active spray agitation is performed. Disposable pipettes can be used to create Br-EG constant flow to agitate for better etching. However, a different pipette or agitation or mixing device may also be used. The spray etching technique should rapidly remove contact material flakes from the interpixel gaps, resulting in high interpixel resistance. The tiles are removed from the etchant and rinsed in deionized water.

Figure 2H:
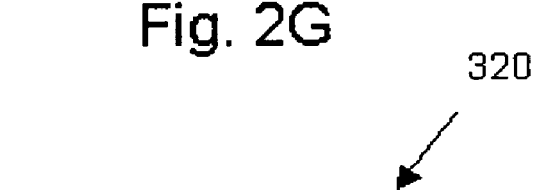

In step 9 shown in FIG. 2H, the remaining resist is stripped using an acetone bath, resulting in tile 320 with a pixel array of contacts. No photoresist therefore remains on the CdTe or CdZnTe detector since it is usually a hygroscopic material that in time would absorb humidity and deteriorate the detector performance.

The overall combination of depositing the metal layer over the entire substrate surface at once, direct photolithography and the etching process results in the improved device interpixel resistance and performance.

Figure 2I:
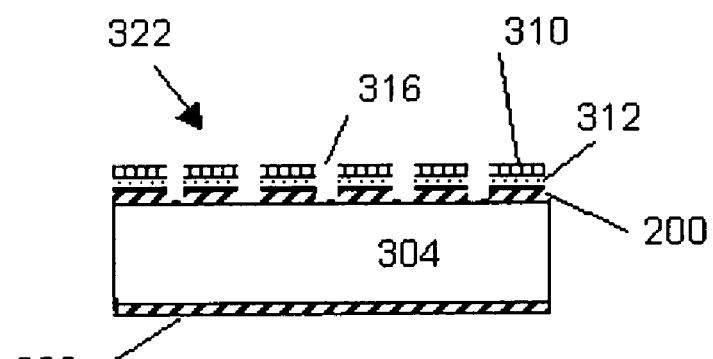

In step 10 shown in FIG. 2I, the primary contact material (in this example gold) on the sides of the fabricated CZT device 322 is removed by side polishing. For example, the side of the tile(s) are first polished with 1200 grit then with 0.3 micron as fine polish. An alternate embodiment could, in step 1, mask the sides of the CZT tile instead of depositing gold on all sides. For this reason, the side contact removal step 10 may be optional. The resulting fabricated CZT device has a cathode electrode 200 remaining on the front side, a pixilated anode electrode array formed of a primary contact layer 200, and secondary contact layers 312 and 310, separated by interpixel gaps 316. FIG. 2I illustrates the multi-layer pixels as being identical width in cross-section for illustrative purpose.

Figure 3A:
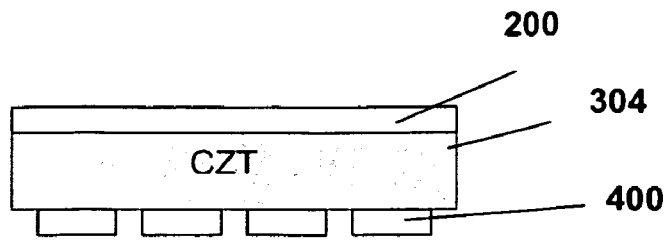
FIGS. 3A-G are schematic cross-section views of a detector substrate at various stages of formation of a solder mask and cathode shield thereon, and connecting the detector to a printed circuit board.
Figure 3B:
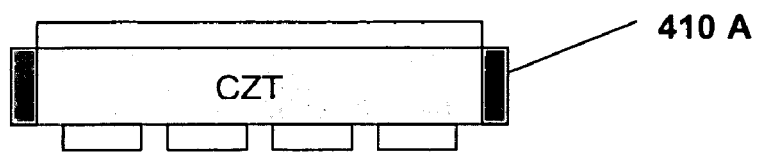

FIG. 3A shows the completed device containing the anode electrode pixels 400. Optionally, a protective coating is applied to the polished side edges shown as coating 410, as shown in FIG. 3B. The CZT tile is dipped in a protective coating (such as Humiseal) to cover the exposed sides and dried for at least 5 hours.

Embodiments of the present invention describe radiation detectors comprising a solder mask. There are numerous ways of fitting a radiation detector with a solder mask. In general, the steps comprise providing a radiation detector, forming a solder mask on the detector and patterning the solder mask to form openings to the anode electrodes. The formed openings permit external access to the anode electrodes 400. More preferably, all of the anodes electrodes 400 are externally accessible via said openings. The solder mask is disposed at least above the anode electrodes and may also be disposed on the side of the tile 304.

There are numerous benefits from using solder masks of the embodiments of the present invention. In one sense, the solder mask has the benefit of serving as a guide for accessing each of the anodes. Knowledge of the exact location of each anode, for example, enables placement of an electrical contact, such as a solder ball, directly on the anode via the opening channels which prevent unwanted spread of the solder ball to other anodes. The opening channels can also prevent the solder balls from coming in contact with the semiconductor surface, particularly in the interpixel gap 316.

As another benefit, the solder mask provides chemical and abrasion resistance. As such, materials used for the solder mask are preferably chemical and/or abrasion resistant. For example, the high hardness of the solder mask prevents mechanical scratching of the semiconductor substrate, optional sidewall shielding cathode portions (referred to as "shielding cathode") and anode surface areas during handling, testing and use. In another example, the solder mask prevents moisture and contamination from accumulating on all non-electrode areas.

Yet another benefit of the solder mask includes electrical isolation of the detector components without using additional insulating or protective layers. Therefore it is preferred that the solder mask comprise a high resistivity insulating material. As such, the solder mask provides electrical isolation between the shielding cathode (when used) and the semiconductor substrate. The solder mask also provides interpixel electrical isolation which is an important aspect of device performance because it is desirable to decrease interpixel leakage currents, for improving the spectral resolution capability of detector devices.

There are various materials suitable for forming the solder mask layer. In general, these materials should be, at least one of: photoimagable, UV/thermal curable, chemically inert, high hardness, high electrical resistivity, or a combination thereof. Photoimageability is particularly preferred since the solder masks are patterned to form openings therein. Other desired properties include good adhesion to pixellated anode electrodes and semiconductor substrates. The solder masks could be in the form of a liquid or dry film during when applied. In a preferred embodiment, the solder mask comprises a polymeric material. However, it is contemplated that classes of materials other than polymers are also applicable to certain embodiments of the present invention. Additionally, more than one type of materials can be combined to form the solder mask.

In a specific, non-limiting example, the solder mask comprises a two component epoxy. Once applied to the detector, the well-mixed two component epoxy layer is thermally and/or UV cured to form a solder mask layer.

The solder mask material may be applied to the detector in many different ways. For example, it can applied as a single continuous layer, several overlapping or butted layers or a combination thereof. The preferred method of applying the solder mask is via spray coating. However, other methods such as dip coating may also be useful.

A specific, non-limiting solder mask forming procedure is as follows:
(1) Mix a solder mask with proper amount of epoxy and thinner;
(2) Optimize spray coating conditions;
(3) Spray coat and UV or thermally cure the edges of the detector one face at a time;
(4) Optionally coat with conductive materials, such as sputtered Au or conductive epoxy, the shielding cathode on outside of the solder mask;
(5) Optionally spray coat and UV or thermally cure the edges of the detector one face at a time;
(6) Spray coat solder mask on detector's anode face;
(7) Expose UV light on solder mask through a mask pattern;
(8) Develop to form openings extending to anode pixels;
(9) Final cure with controlled heat and/or UV. Temperature control should be provided for coating thermal cured solder mask in order to maintain detector performance.

A non-limiting example of a process of forming a solder mask on a detector device, and connecting the same to a printed circuit board (PCB) is illustrated in FIGS. 3A-3G.

Starting with FIG. 3A, an uncoated CZT detector tile 304 is provided with anode electrode pixels 400 and cathode electrode 200. The pixel pattern may be in any pixellated arrangement (including a single anode). The detector may or may not comprise at least one of a guard ring or screening electrode.

Next, in FIG. 3B, a solder mask portion 410A is optionally applied to the edges of the CZT device. Alternatively, other insulating protective coating materials, such as Humiseal may be used.

Figure 3C:
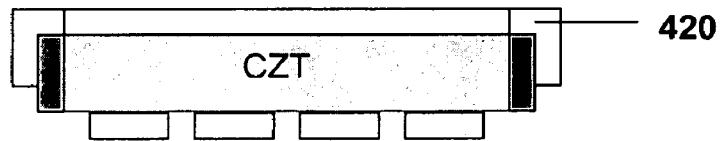

Thereafter, an optional shielding cathode 420 is applied on top of the solder mask portion 410 on the sides of the tile, as shown in FIG. 3C. The shielding cathode 420 comprises a portion of the cathode electrode 200 which extends over the side walls of the tile 304 without making physical contact with the side walls of the tile 304, as described in U.S. application Ser. No. 11/527,707 hereby incorporated by reference in its entirety. Although the shielding cathode is shown as extending over both sides of the substrate, this need not always be the case. The shielding cathode may sometimes only cover one side. Furthermore, in some instances a shielding cathode is not required, and this step may be omitted.

Figure 3D:
Figure 3E:

Next, as shown in FIG. 3D, another solder mask portion 410B is applied to cover the shielding cathode 420 portions extending over the sides of the tile, and to also cover the entire edges of the tile. At this point, solder mask portion 410C is then applied directly to the anode plane (pixellated electrode plane) thereby covering the same, as shown in FIG. 3E. Solder mask portions 410B and C may be formed during the same or different deposition steps. The solder mask portion 410C contacts the anode electrodes 400 and the semiconductor tile 304 interpixel portions 316 exposed between the anode electrodes 400.

Figure 3F:
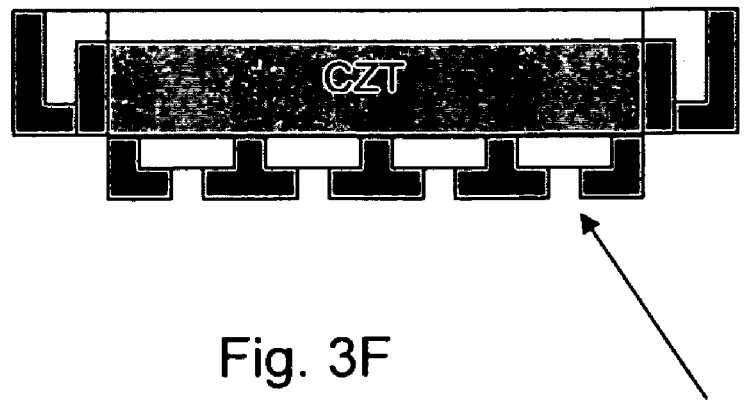
Figure 3G:
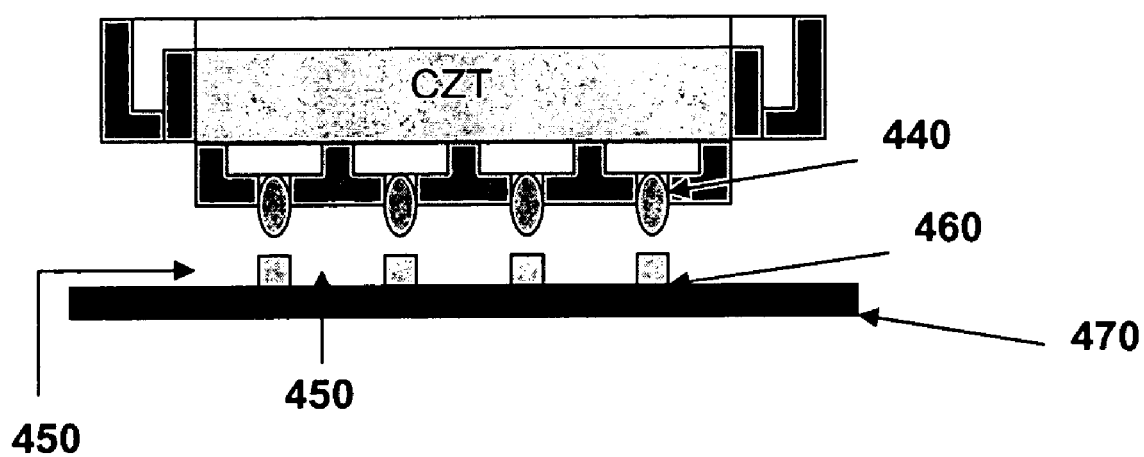

In the next step, the solder mask is patterned to form openings or channels 430 extending to the anodes 400 as shown in FIG. 3F. This is accomplished through conventional photolithography. Preferably, the solder mask is photoimagable such that the portions of the solder mask material 410C over the anodes 400 are directly exposed to radiation, such as UV radiation, through a mask. The radiation either cross links or uncross links the exposed portions of the solder mask, depending on the type of epoxy used (i.e., analogous to a positive or negative photoresist). The uncross linked portions are then selectively developed away to form the openings 430 expositing a portion of the anode 400 surfaces. Alternatively, for a non-photoimagable solder mask material, a convention photoresist mask formed over the solder mask may be used in the patterning step. As shown, the entire detector device is covered with the solder mask except for the cathode and the anode regions exposed through the opening. Preferably, only a portion of each anode 400 is exposed in each opening 430 and no portion of the tile 304 is exposed. Thus, the solder mask is used as a protective coating (i.e., passivation/encapsulation agent) for protecting the whole entire radiation detector device.

Finally, the radiation detector device comprising a solder mask is connected to a readout printed circuit board (PCB) 470, at the underfill filling locations 450 located on the mating pad 460. The solder balls 440 are placed in the openings 430 formed in the solder mask which serve as electrical interconnects between anodes 400 of the detector device and the conductor pads 460 of the printed circuit board 470.

As shown, the openings 430 of the solder mask confine the solder balls 440, preventing unwanted spread thereof. The solder mask also prevents any soldering compound to come in contact with the CZT surface, especially at the inter-pixel gap. Thus the mask solder mask 410, isolates the detector totally from any potential contamination regardless of the method of PCB-attachment applicable to CZT/CdTe detectors.

In an alternative embodiment, the side shielding cathode 420 is omitted. In this embodiment, the portion 410A of solder mask is omitted and portions 410B and 410C can be deposited in the same step.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention. All of the publications, patent applications and patents cited herein are incorporated herein by reference in their entirety.

The invention claimed is:

1. A method of forming a solder mask on a radiation detector comprising the steps of:
    providing a radiation detector comprising:
        a semiconductor substrate having front and rear surfaces;
        a cathode electrode formed on the front surface of said semiconductor substrate; and
        a plurality of anode electrodes formed on the rear surface of said semiconductor substrate;
    forming a solder mask layer directly on the anode electrodes such that said solder mask forms an insulating layer between said plurality of anode electrodes;
    patterning the solder mask layer to form openings extending to the anode electrodes;
    forming an insulating material on side walls of the substrate;
    forming a shielding cathode over the insulating material and over side walls of the substrate without making physical contact with the side walls of the substrate; and
    forming a portion of a solder mask over the shielding cathode.

2. The method of claim 1 wherein the solder mask is in direct contact with interpixel portions of the semiconductor substrate located between the anode electrodes and the solder mask forms a protective coating for the radiation detector.

3. The method of claim 1 wherein the semiconductor substrate comprises CdZnTe or CdTe.

4. The method of claim 1 wherein:
    the openings expose only a portion of a surface of each anode electrode; and
    the anodes electrodes are in pixilated configuration.

5. The method of claim 1 wherein the solder mask comprises an epoxy.

6. The method of claim 1 wherein the step of patterning the solder mask comprises selectively exposing solder mask to radiation to cross link or uncross link selected portions of the solder mask and removing uncross linked portions of the solder mask.

7. The method of claim 1 further comprising forming solder balls in said openings and electrically connecting the solder balls to a printed circuit board.

8. The method of claim 1, wherein the steps of forming the solder mask layer directly on the anode electrodes and forming a portion of the solder mask over the shielding cathode occur during a same deposition step.

9. The method of claim 1, wherein the steps of forming the solder mask layer directly on the anode electrodes and forming a portion of the solder mask over the shielding cathode occur during different deposition steps.

* * * * *